(12) United States Patent
Harada et al.

(10) Patent No.: US 10,768,118 B2
(45) Date of Patent: Sep. 8, 2020

(54) SURFACE DEFECT INSPECTION DEVICE AND METHOD

(71) Applicant: Konica Minolta, Inc., Chiyoda-ku (JP)

(72) Inventors: Koji Harada, Sakai (JP); Masato Kashihara, Nishinomiya (JP); Taizo Wakimura, Kishiwada (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/616,011

(22) PCT Filed: Apr. 6, 2018

(86) PCT No.: PCT/JP2018/014684
§ 371 (c)(1),
(2) Date: Nov. 22, 2019

(87) PCT Pub. No.: WO2018/221006
PCT Pub. Date: Dec. 6, 2018

(65) Prior Publication Data
US 2020/0088650 A1    Mar. 19, 2020

(30) Foreign Application Priority Data

May 29, 2017  (JP) .................................. 2017-105516

(51) Int. Cl.
*G01N 21/88*       (2006.01)
*G01B 11/30*       (2006.01)
*G06T 7/00*        (2017.01)

(52) U.S. Cl.
CPC ......... *G01N 21/8851* (2013.01); *G01B 11/30* (2013.01); *G06T 7/0004* (2013.01);
(Continued)

(58) Field of Classification Search
CPC .. G01N 21/8851; G01B 11/30; G06T 7/0004; G06T 2207/10152; G06T 2207/30156
See application file for complete search history.

(56) References Cited

U.S. PATENT DOCUMENTS

| 5,309,222 A * | 5/1994 | Kamei | ............... G01B 11/2527 356/613 |
| 6,012,825 A | 1/2000 | Horner et al. | |
| 6,266,138 B1 * | 7/2001 | Keshavmurthy | .... G01B 11/303 356/237.2 |

FOREIGN PATENT DOCUMENTS

JP    134207/1989    9/1989
JP    2-149377    6/1990
(Continued)

OTHER PUBLICATIONS

Machine translation of JP H8-086633 (Year: 1996).*
Search Report dated May 13, 2020 issued in European Patent Application 18809699.4.

*Primary Examiner* — Steven Whitesell Gordon
(74) *Attorney, Agent, or Firm* — Cozen O'Connor

(57) ABSTRACT

According to a surface defect inspection device and a surface defect inspection method according to the present invention, an inspection face of an inspection object is irradiated with illumination light, and a defect at the inspection face is detected, based on an image including the inspection face captured. According to the surface defect inspection device and the surface defect inspection method, the illumination light is emitted with formation of at least one set of a light region and a dark region, and a range of a defect detection image region for the detection of the defect, to be set to the image capturing the inspection face irradiated with the illumination light in the light region, is adjusted in accordance with a previously defined degree of visibility for orange peel, at the detection of the defect at the inspection face.

10 Claims, 8 Drawing Sheets

(52) U.S. Cl.
CPC ............... *G06T 2207/10152* (2013.01); *G06T 2207/30156* (2013.01)

(56) References Cited

FOREIGN PATENT DOCUMENTS

| | | |
|---|---|---|
| JP | 8-86633 | 4/1996 |
| JP | H 08-086634 | 4/1996 |
| JP | H 09-079988 | 3/1997 |
| JP | 10-9835 | 1/1998 |
| JP | 2001-133409 | 5/2001 |
| JP | 2003-270162 | 9/2003 |
| JP | 2014-2041 | 1/2014 |

* cited by examiner

FIG. 4
TBa
| DEGREE OF VISIBILITY FOR ORANGE PEEL | ADJUSTMENT VALUE |
|---|---|
| GRADE I | 5 PIXELS |
| GRADE II | 30 PIXELS |
| GRADE III | 60 PIXELS |
| ⋮ | ⋮ |
FIG. 5A
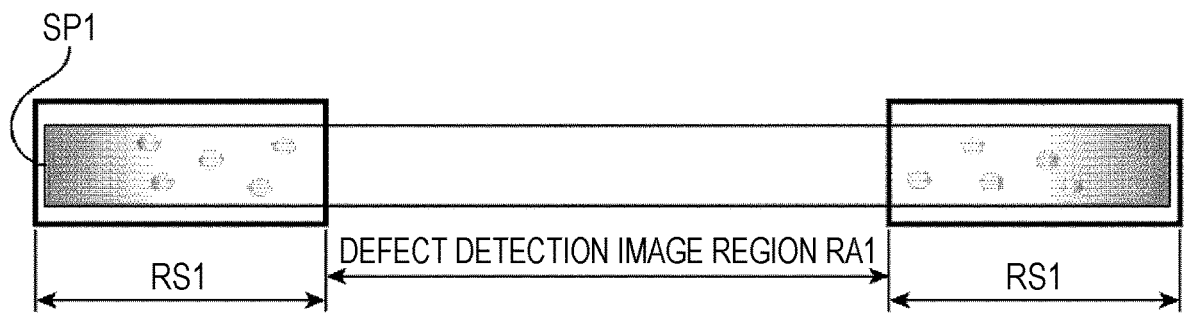
FIG. 5B
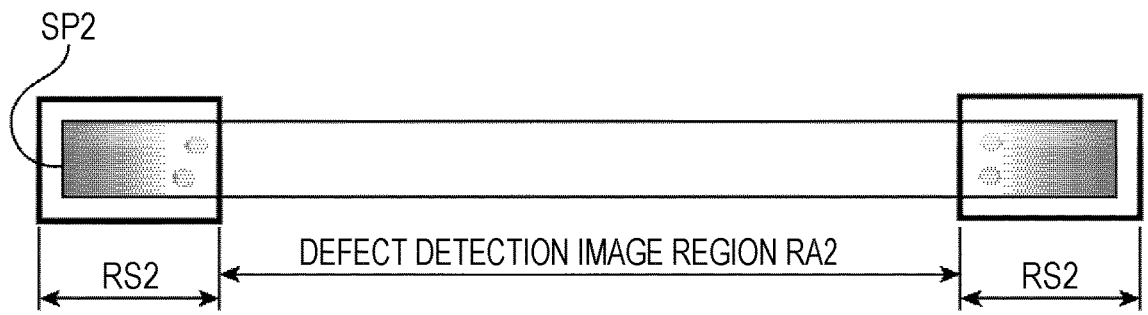

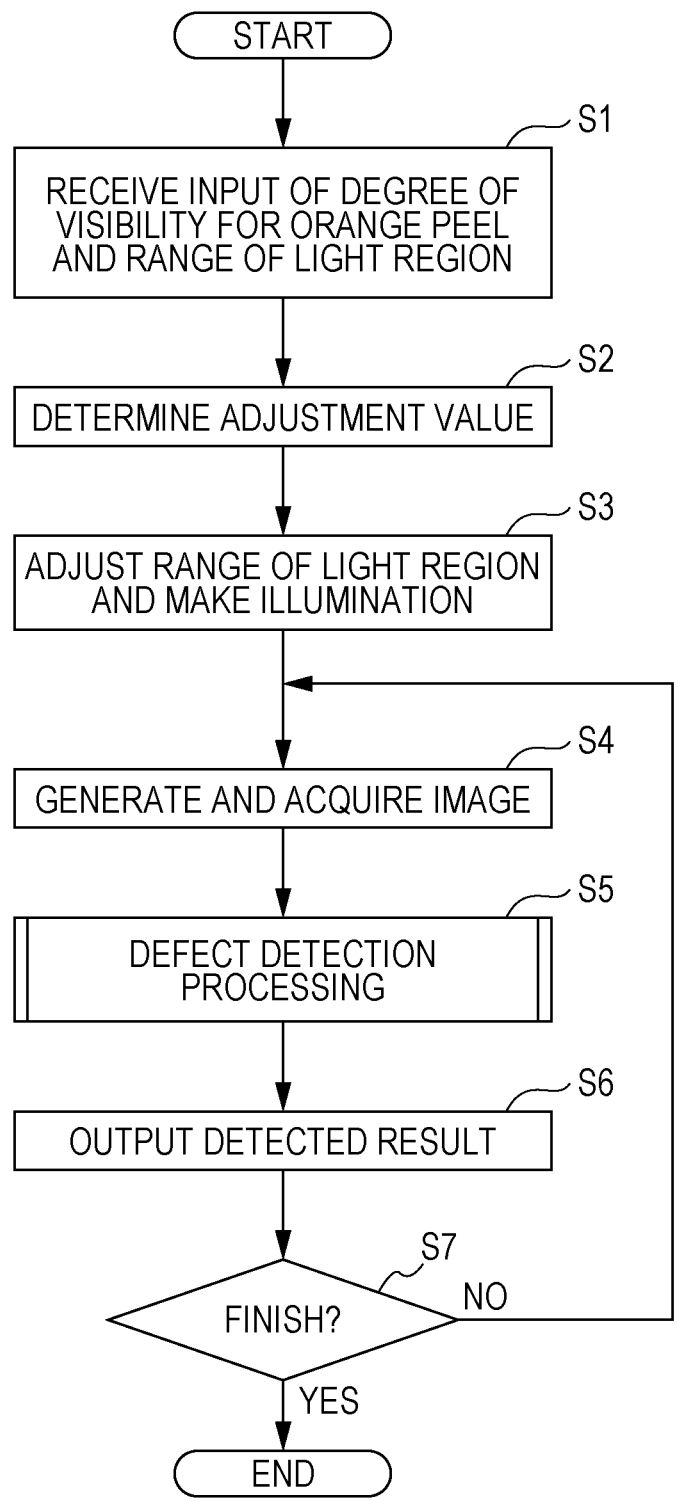

SURFACE DEFECT INSPECTION DEVICE AND METHOD

RELATED APPLICATIONS

This is a U.S. National Phase Application under 35 USC 371 of International Application PCT/JP2018/014684 filed on Apr. 6, 2018.

This application claims the priority of Japanese application no. 2017-105516 filed May 29, 2017, the entire content of which is hereby incorporated by reference.

TECHNICAL FIELD

The present invention relates to a surface defect inspection device that detects a surface defect and a surface defect inspection method of detecting a surface defect.

BACKGROUND ART

Conventionally, has been known a surface defect inspection device that detects a defect at a painted surface of the body of a vehicle, with image processing. For example, such a surface defect inspection device is disclosed in Patent Literature 1. Examples of the defect include so called "seeding", "sagging", and "crawling" that are roughness at painted faces.

The surface defect inspection device disclosed in Patent Literature 1 irradiates an inspection face of an inspection object with light in a light-and-dark pattern, creates a received-light image, on the basis of reflected light from the inspection face, and inspects a defect on the inspection face, on the basis of the received-light image.

As in Patent Literature 1, in a case where a defect is detected from an image acquired by capturing an inspection face illuminated with light, reflected light that travels to an image capturing unit if no defect is present, is reflected by the defect in a direction deviating from the image capturing unit. Thus, the defect is darkly shown on the image. Therefore, a dark portion in the image is extracted by image processing, resulting in detection of the defect. Meanwhile, the roughness of so-called orange peel that is not a defect, is present at a painted surface. In a case where a defect is detected with the method, the roughness of orange peel is likely to be detected wrongly as the defect. Thus, the surface defect inspection device disclosed in Patent Literature 1 expands and contracts, in a case where the area S of a defect candidate region is a previously set reference area Sref or more in the received-light image, a boundary region in the light-and-dark pattern, to integrate orange peel occurring near the boundary region in the light-and-dark pattern, with the boundary region in the light-and-dark pattern. Thus, wrong detection of orange peel is prevented.

For the surface defect inspection device disclosed in Patent Literature 1, in a case where the reference area Sref is set at a relatively large value, the area S of a defect candidate region is less likely to be the reference area Sref or more, resulting in reduction of the image processing of expanding and contracting a boundary region in the light-and-dark pattern. As a result, image processing time, namely, inspection time can be shortened. However, in this case, even though the defect candidate region is based on orange peel, the area S is not necessarily the reference area Sref or more, so that the orange peel is likely to be wrongly detected.

CITATION LIST

Patent Literature

Patent Literature 1: JP H10-9835 A

SUMMARY OF INVENTION

Technical Problem

The present invention has been made in consideration of the situation. An object of the present invention is to provide a surface defect inspection device and a surface defect inspection method that enable reduction of wrong detection of orange peel and shortening of inspection time.

Solution to Problem

In order to achieve the object, according to a surface defect inspection device and a surface defect inspection method according to one aspect of the present invention, an inspection face of an inspection object is irradiated with illumination light, and a defect at the inspection face is detected, based on an image including the inspection face captured. According to the surface defect inspection device and the surface defect inspection method, the illumination light is emitted with formation of at least one set of a light region and a dark region, and a range of a defect detection image region for the detection of the defect, to be set to the image capturing the inspection face irradiated with the illumination light in the light region, is adjusted in accordance with a previously defined degree of visibility for orange peel, at the detection of the defect at the inspection face.

Advantages and features according to one or a plurality of embodiments of the invention will be fully understood from the following given detailed descriptions and the accompanying drawings. The detailed descriptions and the accompanying drawings are given only as examples, and thus are not intended to limit the present invention.

BRIEF DESCRIPTION OF DRAWINGS

FIG. 4 illustrates a correspondence relationship information table according to the first aspect, stored in the surface defect inspection device.

FIG. 5 is an explanatory view of the relationship between the degree of visibility for orange peel and an adjustment value.

FIG. 6 is a flowchart of the operation of the surface defect inspection device.

DESCRIPTION OF EMBODIMENTS

An embodiment according to the present invention will be described below on the basis of the drawings. However, the scope of the invention is not limited to the disclosed embodiment. Note that constituents denoted with the same reference signs in the figures, are indicated as the same, and thus the descriptions thereof will be appropriately omitted. In the present specification, reference signs are indicated with respective indices omitted in a case where a generic name is used, and reference signs denoted with respective indices are indicated in a case where each individual constituent is described.

According to the present embodiment, provided is a surface defect inspection device that irradiates an inspection face of an inspection object Ob with illumination light, and detects a defect at the inspection face, based on an image including the inspection face captured, the surface defect inspection device including: an illuminator that forms at least one set of a light region and a dark region, and emits the illumination light with the formation; and a region adjustment unit that adjusts a range of a defect detection image region for the detection of the defect, to be set to the image capturing the inspection face irradiated with the illumination light in the light region, in accordance with a previously defined degree of visibility for orange peel, at the detection of the defect at the inspection face. The surface defect inspection device and a surface defect inspection method implemented therein enable reduction of wrong detection of orange peel and shortening of inspection time because the range of the defect detection image region is adjusted in accordance with the previously defined degree of visibility for orange peel. Such a surface defect inspection device and a surface defect inspection method implemented therein will be described below more specifically.

Figure 1:
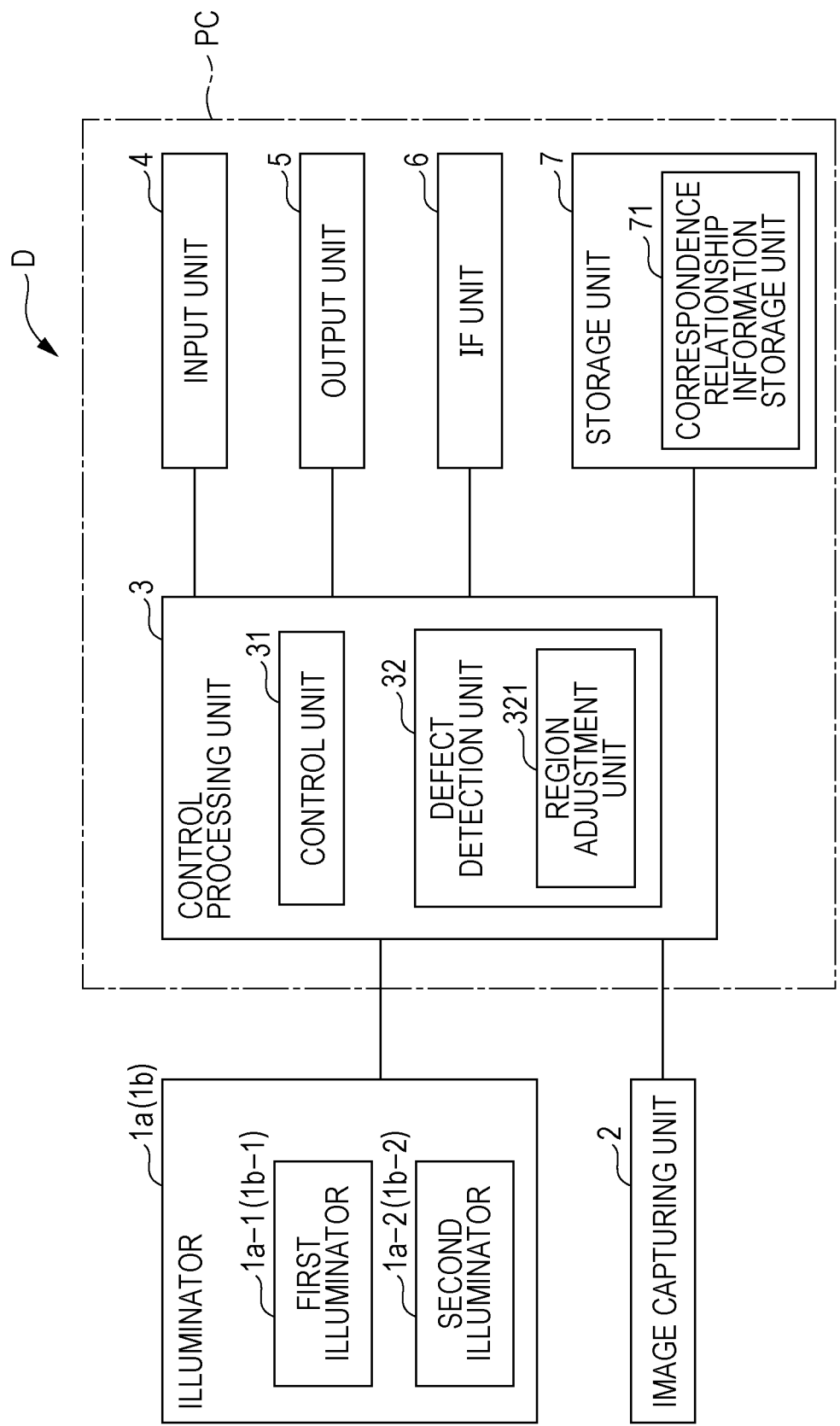
FIG. 1 is a block diagram of the configuration of a surface defect inspection device according to an embodiment.
Figure 2:
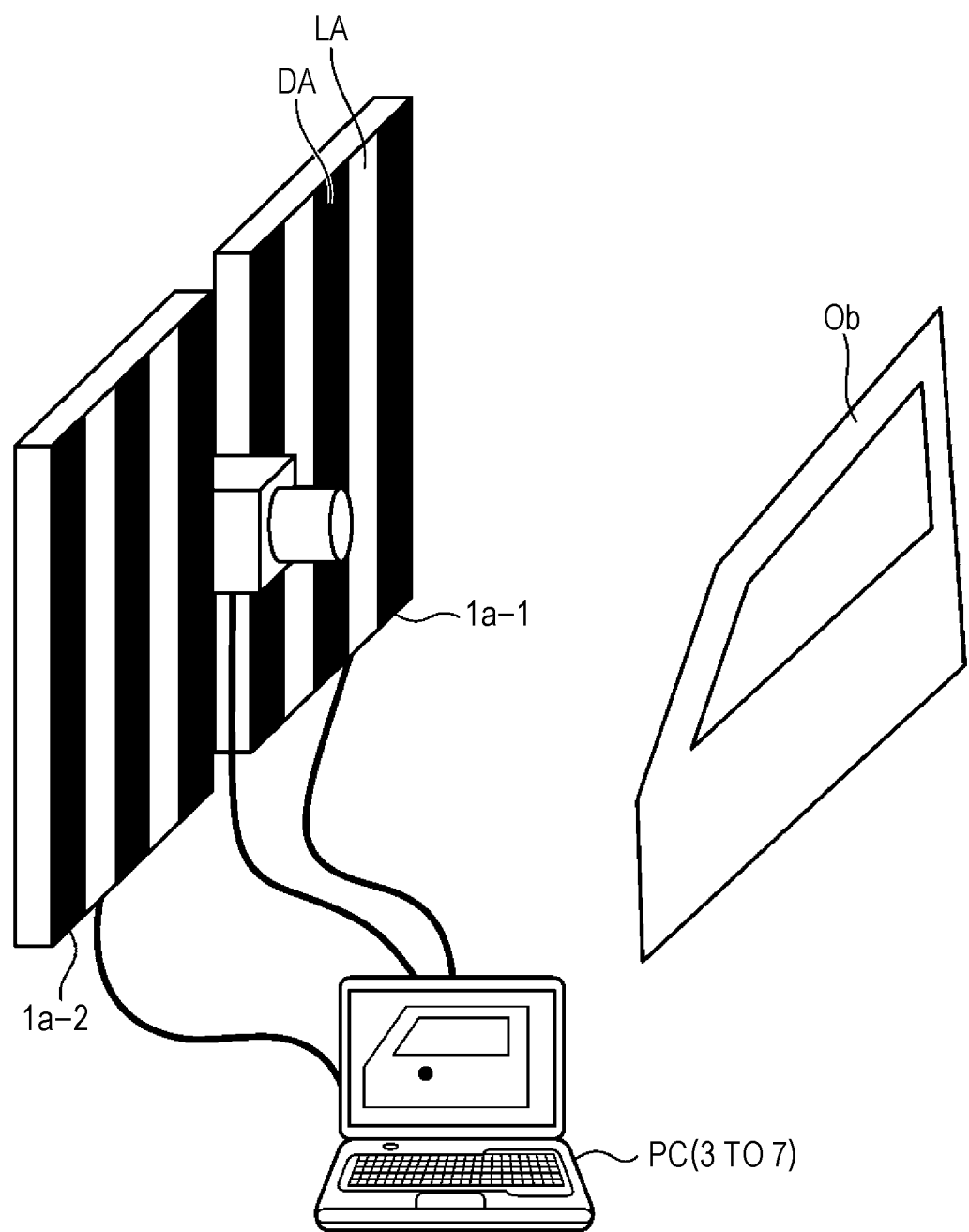
FIG. 2 is a schematic view of the external appearance of the configuration of the surface defect inspection device.
Figure 3A:
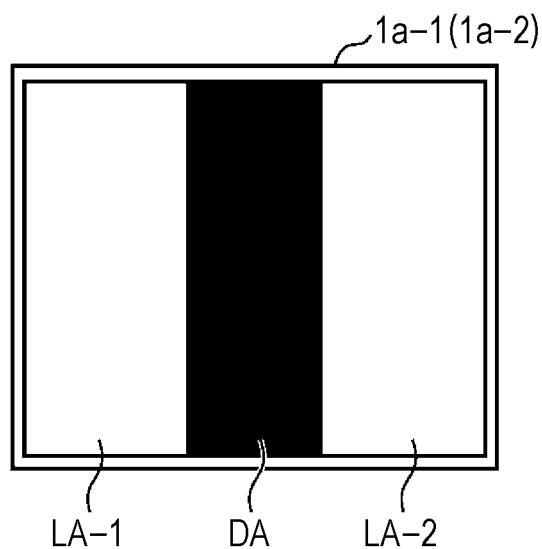
FIG. 3 is an explanatory view of an illuminator according to a first aspect in the surface defect inspection device and exemplary illumination patterns thereof.
Figure 3B:
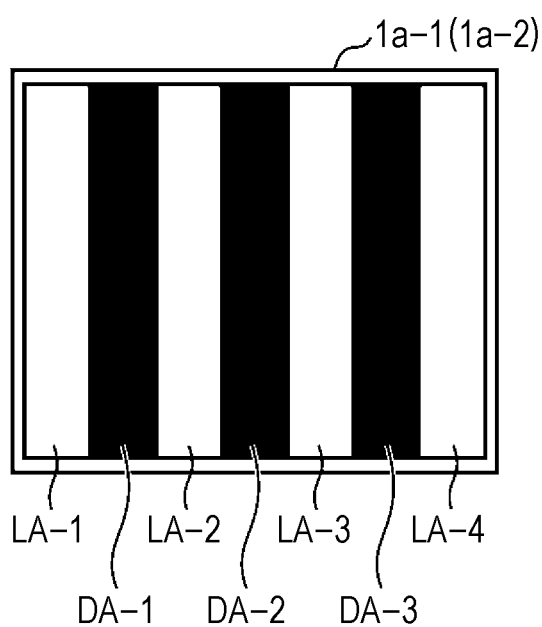

FIG. 1 is a block diagram of the configuration of a surface defect inspection device according to an embodiment. FIG. 2 is a schematic view of the external appearance of the configuration of the surface defect inspection device. FIG. 3 is an explanatory view of an illuminator according to a first aspect in the surface defect inspection device and exemplary illumination patterns thereof. FIG. 3A illustrates an illuminator 1a-1 (1a-2) radiating illumination light in a first illumination pattern. FIG. 3B illustrates the illuminator 1a-1 (1a-2) radiating illumination light in a second illumination pattern. FIG. 4 illustrates a correspondence relationship information table according to the first aspect, stored in the surface defect inspection device. FIG. 5 is an explanatory view of the relationship between the degree of visibility for orange peel and an adjustment value. FIG. 5A illustrates a case where the adjustment value requires relatively increasing because the visibility for orange peel is relatively high. FIG. 5B illustrates a case where the adjustment value can be relatively decreased because the visibility for orange peel is relatively low.

As illustrated in FIGS. 1 and 2, for example, the surface defect inspection device D according to the embodiment includes an illuminator 1a, an image capturing unit 2, and a device body PC. The device body PC includes a control processing unit 3, an input unit 4, an output unit 5, an interface unit (IF unit) 6, and a storage unit 7.

The illuminator 1a connected to the control processing unit 3 of the device body PC, is a device that forms at least one set of a light region and a dark region and emits illumination light, in accordance with the control of the control processing unit 3. According to the present embodiment, as illustrated in FIG. 2, the illuminator 1a includes two illuminators of the first and second illuminators 1a-1 and 1a-2 disposed in parallel with each other with the image capturing unit 2 interposed therebetween. For example, the first and second illuminators 1a-1 and 1a-2 each include: a light source unit that radiates light; and a light-and-dark region formation unit that forms at least one set of the light region and the dark region and makes illumination with the light radiated from the light source unit as the illumination light. As illustrated in FIG. 3, for example, the first and second illuminators 1a-1 and 1a-2 each include a high-luminance display, such as a high-luminance liquid crystal display. In a case where the illuminator 1a includes a high-luminance liquid crystal display, a backlight that radiates light corresponds to an example of the light source unit, and a liquid crystal panel that is disposed ahead of the light-radiating face of the backlight and makes control such that the light from the backlight is transmitted or blocked every pixel, corresponds to an example of the light-and-dark region formation unit.

The image capturing unit 2 connected to the control processing unit 3 of the device body PC, is a device that captures an inspection face of an inspection object Ob and generates an image, in accordance with the control of the control processing unit 3. As described later, a defect is detected by image processing of the image with a pixel value. Thus, for example, the image capturing unit 2 may include a camera that generates an image in color or a camera that generates an image in monochrome.

The input unit 4 connected to the control processing unit 3 of the device body PC, is a device that inputs various commands, such as a command for start of inspection, and various types of data necessary for the inspection, such as the degree of visibility for orange peel and the range of the light region LA, into the surface defect inspection device D. For example, the input unit 4 includes a plurality of input switches allocated to predetermined functions, a keyboard, and a mouse. The output unit 5 connected to the control processing unit 3 of the device body PC, is a device that outputs a command or data input from the input unit 4 and a detected result acquired by the surface defect inspection device D, in accordance with the control of the control processing unit 3. For example, the output unit 5 includes a display, such as a CRT display, a liquid crystal display (LCD), or an organic EL display, or a print device, such as a printer.

Note that the input unit 4 and the output unit 5 may form a touch panel. For formation of the touch panel, the input unit 4 is a pointing device that detects and inputs an operated position, such as a resistive pointing device or a capacitive pointing device, and the output unit 5 is a display. In the touch panel, the pointing device is provided on the display face of the display. One or a plurality of input-content candidates inputtable is displayed on the display. When a user touches the display position at which an input content to be input is displayed, the pointing device detects the position to input the display content displayed at the detected position, as the input content operated by the user, into the surface defect inspection device D. Such a touch panel enables the user to easily understand an input operation intuitively. Thus, the surface defect inspection device D easy to handle is provided to the user.

The IF unit 6 connected to the control processing unit 3 of the device body PC, is a circuit that inputs and outputs data together with external equipment, in accordance with the control of the control processing unit 3. Examples of the IF unit 6 include an RS-232C interface circuit in a serial communication scheme, an interface circuit with a Bluetooth (registered trademark) standard, an interface circuit that performs infrared communication, such as an Infrared Data Association (IrDA) standard, and an interface circuit with a Universal Serial Bus (USB) standard. The IF unit 6 may be a circuit that performs communication with external equipment, such as a data communication card or a communication interface circuit in conformity with an IEEE 802.11 standard.

The storage unit 7 connected to the control processing unit 3 of the device body PC, is a circuit that stores various predetermined programs and various pieces of predetermined data, in accordance with the control of the control processing unit 3.

The various predetermined programs include a control program and a defect detection program. The control program controls the units 1a, 2, and 4 to 7 of the surface defect inspection device D, in accordance with the respective functions of the units. According to the present embodiment, at control of the illuminator 1a, the control program controls the illuminator 1a such that the range of the light region LA received by the input unit 4 is achieved. The defect detection program detects the defect occurring at the inspection face of the inspection object Ob, on the basis of the image generated by the image capturing unit 2. According to the present embodiment, at detection of the defect at the inspection face, in accordance with the previously defined degree of visibility for orange peel, the defect detection program adjusts the range of a defect detection image region for detection of the defect, to be set to the image capturing the inspection face irradiated with the illumination light in the light region. For example, the various types of predetermined data includes data necessary for execution of each program, such as correspondence relationship information, the image generated by the image capturing unit 2, and various intermediate images generated by the image processing for detection of the defect as described later.

For example, the storage unit 7 includes a read only memory (ROM) that is a nonvolatile storage element or an electrically erasable programmable read only memory (EEPROM) that is a rewritable nonvolatile storage element. The storage unit 7 includes a random access memory (RAM) that serves as a so-called working memory for the control processing unit 3 that stores, for example, data generated during execution of each of the predetermined programs. The storage unit 7 functionally has a correspondence relationship information storage unit 71 for storage of the correspondence relationship information.

The correspondence relationship information storage unit 71 stores information indicating the range of the defect detection image region meeting the previously defined degree of visibility for orange peel. According to the present embodiment, the correspondence relationship information storage unit 71 stores the adjustment value for adjustment of the range of the defect detection image region in association with the degree of visibility for orange peel, as the correspondence relationship information. The degree of visibility for orange peel indicates how easy orange peel is to view. The degree of visibility for orange peel is indicated with, for example, previously appropriately set grade levels. According to the present embodiment, the degree of visibility for orange peel increases sequentially in the order of grade I, grade II, grade III, and so on (the orange peel is getting easier to view).

According to the present embodiment, the defect is detected from the image acquired by capturing the inspection face illuminated with the illumination light having formation of at least one set of the light region and the dark region. For such a detection method, as illustrated in FIGS. 5A and 5B, orange peel in images SP1 and SP2 each capturing the inspection face, is easily viewed in peripheral portions in the image of a portion illuminated with the illumination light in the light region (light image) (portions close to the boundaries between the light region and dark regions in the light image), and the orange peel is hardly viewed closer to the central position of the light image. In practice, for such orange peel, no uniform visibility is present even in the peripheral portions of the light image in which the orange peel is easily viewed. Depending on the state of orange peel, the visibility is relatively high as illustrated in FIG. 5A or the visibility is relatively low as illustrated in FIG. 5B. Therefore, when the visibility for orange peel is relatively high, in order to prevent the orange peel from being detected as the defect, as illustrated in FIG. 5A, the range of a defect detection image region RA1 requires relatively narrowing with relatively large deletion of each peripheral portion of the light image with a first adjustment value RS1. Meanwhile, in a case where the visibility for orange peel is relatively low, the distance from each of the boundaries between the light region and the dark regions in the image SP2, to the point at which no orange peel is viewed, toward the central position, is shorter than that in a case where the visibility for orange peel is relatively high. Thus, as illustrated in FIG. 5B, deletion is sufficient with a second adjustment value RS2 with which each peripheral portion in the image of the portion illuminated with the illumination light in the light region is relatively small. Thus, the range of a defect detection image region RA2 can be relatively widened (RS1>RS2, RA1<RA2). From such a viewpoint, the degree of visibility for orange peel is appropriately classified into a plurality of grades (graded). The range of the defect detection image region meeting each of the plurality of grades, according to the present embodiment, the adjustment value for adjustment of the range of the defect detection image region is appropriately set, for example, from results with a plurality of samples.

According to the present embodiment, the correspondence relationship information indicating the correspondence relationship between the degree of visibility for orange peel and the range of the defect detection image region (adjustment value according to the present embodiment) is stored in a table format in the correspondence relationship information storage unit 71. For example, as illustrated in FIG. 4, a correspondence relationship information table TBa in which the correspondence relationship information is registered, includes an orange-peel visibility-degree field 711 in which the grades indicating the degree of visibility for orange peel are registered, and an adjustment-value field 712 in which the adjustment value corresponding to each grade registered in the orange-peel visibility-degree field 711, is registered. The correspondence relationship information table TBa has a record for each grade (for each degree of visibility). In the example illustrated in FIG. 4, in a case where the degree of visibility for orange peel is grade I, the adjustment value corresponds to 5 pixels. In a case where the degree of visibility for orange peel is grade II, the adjustment value corresponds to 30 pixels. In a case where the degree of visibility for orange peel is grade III, the adjustment value corresponds to 60 pixels. In the example illustrated in FIG. 4, the adjustment value that is the width of the light image to be deleted from each peripheral portion of the light image, is indicated with the number of pixels.

Referring back to FIGS. 1 and 2, the control processing unit 3 is a circuit that controls the units 1$a$, 2, and 4 to 7 of the surface defect inspection device D, in accordance with the respective functions of the units, to detect the defect at the inspection face of the inspection object Ob. For example, the control processing unit 3 includes a central processing unit (CPU) and the peripheral circuit thereof. Execution of the control processing program causes the control processing unit 3 to functionally have a control unit 31 and a defect detection unit 32 and causes the defect detection unit 32 to functionally have a region adjustment unit 321.

The control unit 31 controls the units 1$a$, 2, and 4 to 7 of the surface defect inspection device D, in accordance with the respective functions of the units, to control the entirety of the surface defect inspection device D. According to the present embodiment, at control of the illuminator 1$a$, the control unit 31 controls the illuminator 1$a$ such that the range of the light region LA received by the input unit 4 is achieved. More specifically, as above, the illuminator 1$a$ includes a light source unit and a light-and-dark region formation unit, the control unit 31 controls the light-and-dark region formation unit such that the range of the light region received by the input unit 4 is achieved. According to the present embodiment, as above, the illuminator 1$a$ is a high-luminance display, such as a high-luminance liquid crystal display. The control unit 31 controls the high-luminance display such that the range of the light region received by the input unit 4 is achieved. For example, in a case where the illuminator 1$a$ is a high-luminance liquid crystal display, the control unit 31 controls each pixel of a liquid crystal panel in the high-luminance liquid crystal display such that the range of the light region received by the input unit 4 is achieved.

The defect detection unit 32 detects the defect, on the basis of the image generated by the image capturing unit 2 having capturing the inspection face of the inspection object Ob illuminated by the illuminator 1$a$, stores a detected result from the detection into the storage unit 7, and outputs the detected result to the output unit 5.

At detection of the defect at the inspection face, in accordance with the previously defined degree of visibility for orange peel, the region adjustment unit 321 adjusts the range of the defect detection image region for detection of the defect, to be set to the image capturing the inspection face irradiated with the illumination light in the light region. More specifically, the region adjustment unit 321 determines the adjustment value corresponding to the degree of visibility for orange peel received by the input unit 4 (grade according to the present embodiment), from the correspondence relationship information stored in the correspondence relationship information storage unit 71 of the storage unit 7, and adjusts the range of the defect detection image region with the determined adjustment value.

Note that the device body PC including the control processing unit 3, the input unit 4, the output unit 5, the IF unit 6, and the storage unit 7, can be provided by, for example, a desktop computer or a note computer.

Figure 7:
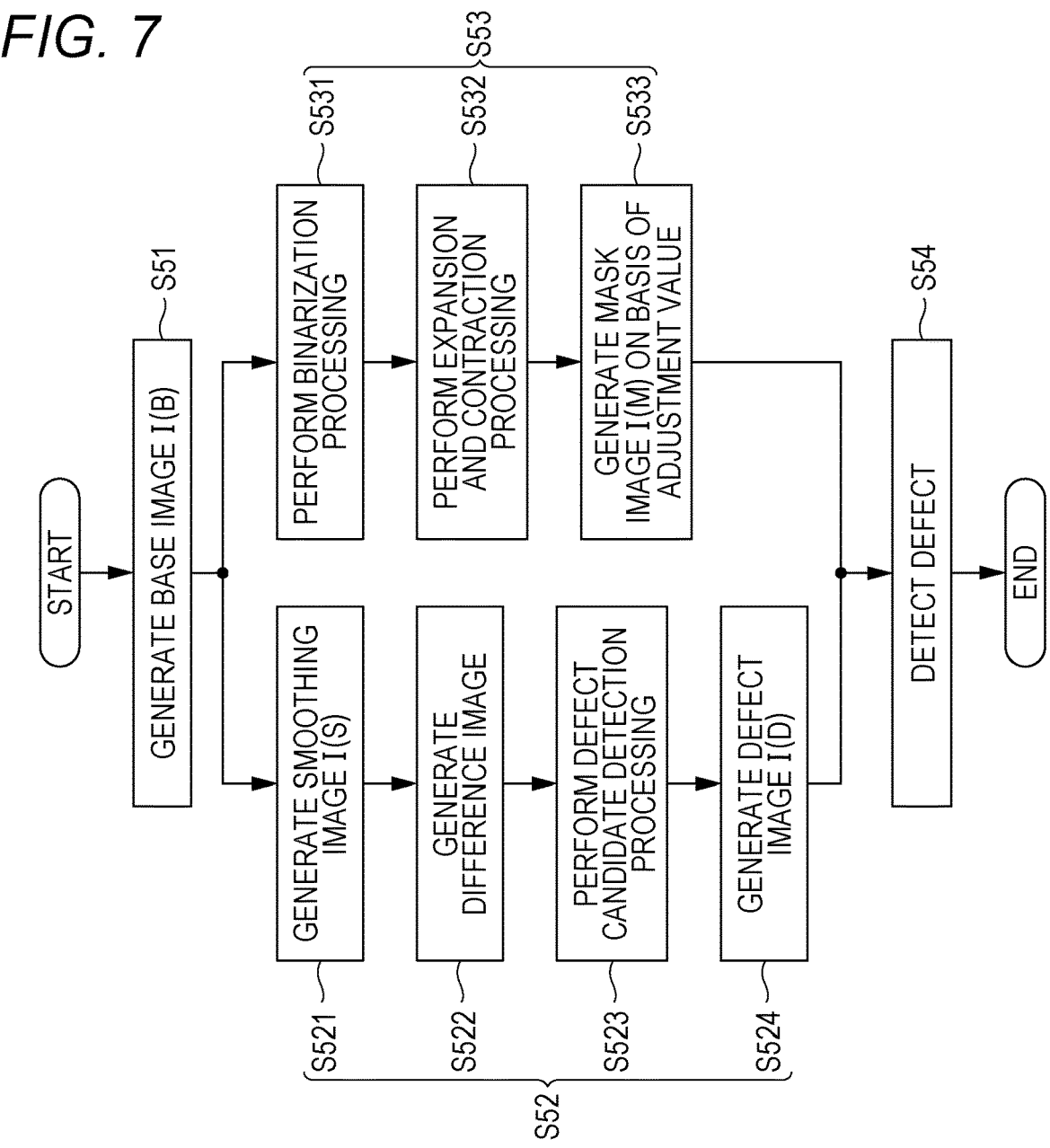
FIG. 7 is an explanatory flowchart of defect detection processing in the flowchart illustrated in FIG. 6.
Figure 8:
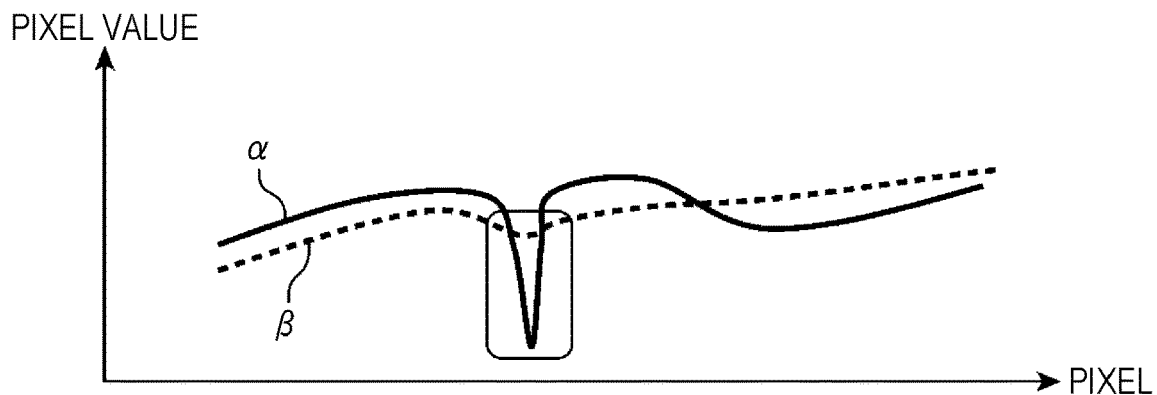
FIG. 8 is an explanatory graph of defect candidate detection processing illustrated in FIG. 7.
Figure 9A:
FIG. 9 is an explanatory view of expansion and contraction processing illustrated in FIG. 7.
Figure 9B:
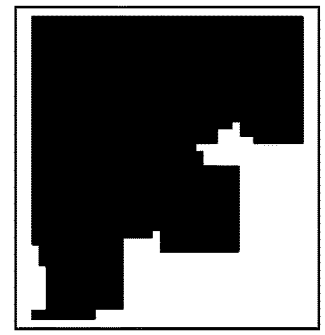

Next, the operation according to the present embodiment will be described. FIG. 6 is a flowchart of the operation of the surface defect inspection device. FIG. 7 is an explanatory flowchart of defect detection processing in the flowchart illustrated in FIG. 6. FIG. 8 is an explanatory graph of defect candidate detection processing illustrated in FIG. 7. FIG. 9 is an explanatory view of expansion and contraction processing illustrated in FIG. 7. FIG. 9A illustrates an exemplary binarized image I(BN) before expansion processing, and FIG. 9B illustrates an exemplary binarized image I(BN) after the expansion processing.

The surface defect inspection device D having such a configuration performs, when power thereto is turned on, initialization necessary for each unit, to start to operate each unit. Execution of the control processing program causes the control processing unit 3 to functionally have the control unit 31 and the defect detection unit 32 and causes the defect detection unit 32 to functionally have the region adjustment unit 321.

Then, in FIG. 6, at detection of the defect at the inspection face of the inspection object Ob, the surface defect inspection device D first causes the control processing unit 3 to output a message for input of the degree of visibility for orange peel (grade in value) and input of the range of the light region (e.g., "Please input the grade for the defect and the width of the light region.") from the output unit 5 and to receive the respective inputs of the degree of visibility for orange peel and the range of the light region from the input unit 4 (S1).

The user (operator) prompted by the message inputs the degree of visibility for orange peel (grade in value) and the range of the light region (width of the light region LA according to the present embodiment) through the input unit 4.

Next, when the respective inputs of the degree of visibility for the orange peel and the range of the light region are received by the input unit 4 in processing at S1, the surface defect inspection device D causes the region adjustment unit 321 to determine the adjustment value, on the basis of the degree of visibility for orange peel (grade in value) input in the processing at S1 (S2). More specifically, the region adjustment unit 321 acquires the adjustment value corresponding to the degree of visibility for orange peel (grade in value) input in the processing at S1, from the correspondence relationship information storage unit 71 of the storage unit 7. More particularly, the region adjustment unit 321 selects (retrieves) the record for the registration in the orange-peel visibility-degree field 711 corresponding to the degree of visibility for orange peel (grade in value) input in the processing at S1, from the correspondence relationship information table TBa stored in the correspondence relationship information storage unit 71, and extracts the adjustment value registered in the adjustment-value field 712 in the selected record.

Next, the surface defect inspection device D causes the control unit 31 to adjust the illuminator 1$a$ such that the range of the light region received in the processing at S1 is achieved, and then the illuminator 1$a$ makes illumination (S3). More specifically, as above, in a case where the illuminator 1$a$ includes a light source unit and a light-and-dark region formation unit, the control unit 31 controls the light-and-dark region formation unit such that the range of the light region received in the processing at S1 is achieved. More particularly, the illuminator 1$a$ is a high-luminance liquid crystal display, and the control unit 31 controls each pixel of a liquid crystal panel in the high-luminance liquid crystal display such that the range of the light region received in the processing at S1 is achieved. In a specific example, the control unit 31 controls each of the first and second illuminators 1$a$-1 and 1$a$-2 in the illuminator 1$a$ such that, as illustrated in FIG. 3A, an illumination pattern is achieved in which a first light region LA-1 in a relatively wide rectangular shape (zonal shape, stripe shape), a dark region DA in a rectangular shape narrower in width than the first light region LA-1, and a second light region LA-2 in a rectangular shape the same in width as the first light region LA-1, are sequentially disposed in parallel. In another specific example, the control unit 31 controls each of the first and second illuminators 1a-1 and 1a-2 in the illuminator 1a such that, as illustrated in FIG. 3B, a light-and-dark illumination pattern is achieved in which four light regions of first to fourth light regions LA-1 to LA-4 each in a relatively narrow rectangular shape and three dark regions of first to third dark regions DA-1 to DA-3 each in a rectangular shape the same in width as the first to fourth light regions LA-1 to LA-4 are alternately disposed in parallel. In such examples, the illuminator 1a forms a plurality of sets of the light region LA and the dark region DA, and emits illumination light. This arrangement enables inspection of the inspection face in a wide range.

Next, when the inspection face of the inspection object Ob is illuminated with the illumination light having formation of at least one set of the light region and the dark region in the processing at S3, the surface defect inspection device D causes the defect detection unit 32 of the control processing unit 3 to cause the image capturing unit 2 to capture the inspection face of the inspection object Ob illuminated by the illuminator 1a as above, resulting in acquisition of an image of the inspection face generated by the image capturing unit 2 (S4).

Next, the surface defect inspection device D causes the defect detection unit 32 to detect the defect on the basis of the image generated by the image capturing unit 2 and to store a detected result from the detection into the storage unit 7 (S5).

A publicly known method may be used as a method of detecting the defect. According to the present embodiment, the following method is used for detection of the defect.

In FIG. 7, with a predetermined image filter, the defect detection unit 32 performs edge preserving smoothing processing to the image I(O) acquired in the processing at S4 so that so-called image salt-and-pepper noise is removed with retention of the boundary between the image due to the light region LA of the illumination light (light image) and the image due to the dark region DA of the illumination light (dark image). This arrangement causes a base image I(B) to be generated from the image I(O) acquired in the processing at S4 (S51).

Next, the defect detection unit 32 performs, mutually parallel, defect preliminary detection processing of detecting defects preliminarily at S52 and mask generation processing of generating a mask for extraction of the defect present in the light image from the preliminarily detected defects at S53, performs sequentially the defect preliminary detection processing at S52 and the mask generation processing at S53 in this order, or performs sequentially the mask generation processing at S53 and the defect preliminary detection processing at S52 in this order.

In the defect preliminary detection processing at S52, more specifically, for detection of a sharp drop indicating the defect on a curve α illustrated in FIG. 8, the defect detection unit 32 first performs, to the base image I(B) generated in the processing at S51, moving average processing of moving a target pixel and acquiring the average in a predetermined range, such as 3×3 pixels or 4×4 pixels, with the target pixel at the center, as the pixel value of the target pixel, to generate a smoothing image I(S) from the base image I(B) (S521). That is, for detection of the sharp drop indicating the defect, the smoothing image I(S) is created to generate a difference between the curve α and a curve β illustrated in FIG. 8.

Next, the defect detection unit 32 acquires the difference between the smoothing image I(S) generated in the processing at S521 and the base image I(B) generated in the processing at S51, more specifically, subtracts the base image I(B) generated in the processing at S51 from the smoothing image I(S) generated in the processing at S521, to generate a difference image I(Sub) (S522). In the processing, for example, as illustrated in FIG. 8, the difference acquired between the smoothing-image pixel-value curve β consisting of the respective pixel values of the pixels in one line (row) in the smoothing image I(S) and the base-image pixel-value curve α consisting of the respective pixel values of the pixels in the one line (row) in the base image I(B), is large at the defect portion darkly shown on the image.

Note that, in the above, the difference image I(Sub) is generated by acquisition of the difference between the smoothing image I(S) generated in the processing at S521 and the base image I(B) generated in the processing at S51. However, instead of the difference image I(Sub), a ratio image I(Div) may be generated by acquisition of the ratio between the smoothing image I(S) generated in the processing at S521 and the base image I(B) generated in the processing at S51.

Next, the defect detection unit 32 binarizes the difference image I(Sub) acquired in the processing at S522 every pixel, in comparison to a previously set predetermined threshold (first binarization threshold), to detect a defect candidate, resulting in generation of a defect candidate image I(RD) (S523). That is, in a case where the pixel value is expressed with 8 bits from 0 to 255, when the pixel value of each pixel (difference value in the processing at S522) is less than the first binarization threshold, the pixel value of each pixel results in 0. When the pixel value of each pixel (difference value in the processing at S522) is the first binarization threshold or more, the pixel value of each pixel results in 255. The first binarization threshold is previously appropriately set from a plurality of samples.

Next, from the defect candidate image I(RD) generated in the processing at S523, the defect detection unit 32 generates a defect image I(D) in which a portion in which pixel values of 255 aggregate in an area that is a previously set predetermined threshold (defect detection threshold) or more, is extracted with a given label (e.g., a serial number) as a defect so that a portion in which pixel values of 255 aggregate in a small area on the image is deleted as noise (S524). The defect detection threshold is previously appropriately set from a plurality of samples.

In this manner, the defect preliminary detection processing at S52 is performed.

Meanwhile, in the mask generation processing at S53, more specifically, for extraction of the light image and the dark image, the defect detection unit 32 first binarizes the base image I(B) generated in the processing at S51 every pixel, in comparison to a previously set predetermined threshold (second binarization threshold), to generate a binarized image I(BN) (S531). That is, in a case where the pixel value is expressed with 8 bits from 0 to 255, when the pixel value of each pixel is less than the second binarization threshold, the pixel value of each pixel results in 0. When the pixel value of each pixel is the second binarization threshold or more, the pixel value of each pixel results in 255. The second binarization threshold is previously appropriately set from a plurality of samples.

For example, as illustrated in FIG. 9A, the binarized image I(BN) generated in the processing at S531 is missing in places. Thus, as illustrated in FIG. 9B, the defect detection unit 32 next performs, to the binarized image I(BN) generated in the processing at S531, the expansion processing of expanding and combining the dark image at the boundary between the light image and the dark image, to the light image side. Then, the defect detection unit 32 performs contraction by the number of times of expansion to recover the original size, and generates an expanded and contracted image I(EX) (S532).

For removal of so-called orange peel appearing on the image at the boundary portion between the light region and the dark region, the defect detection unit 32 moves the boundary between the light image and the dark image in the expanded and contracted image I(EX), backward to the light image side by the adjustment value determined in the processing at S2, to generate a mask image I(M) (S533). More specifically, the defect detection unit 32 deletes the light image side from the boundary between the light image and the dark image, by the width for the number of pixels of the adjustment value determined in the processing at S2. That is, the defect detection unit 32 changes the pixels in the width for the number of pixels of the adjustment value determined in processing S2, on the light image side from the boundary between the light image and the dark image, to the dark image. According to the present embodiment, the light image that is the image of the portion illuminated with the illumination light in the light region, corresponds to an example of the defect detection image region. In the processing at S533, the light image side from the boundary between the light image and the dark image is deleted by the number of pixels of the adjustment value determined in the processing at S2, so that the range of the defect detection image region is adjusted with the adjustment value.

In this manner, the mask generation processing at S53 is performed.

Next, the defect detection unit 32 makes an AND operation between the defect image I(D) generated in the processing at S524 in the defect preliminary detection processing at S52 and the mask image I(M) generated in the processing at S533 in the mask generation processing at S53, to extract, as the final defect, the defect in the defect image I(D) occurring in the portion corresponding to the light image (namely, the range of the defect detection image region adjusted with the adjustment value in the processing at S533) in the mask image I(M) (S54). Then, the present defect detection processing at S5 finishes.

After the defect detection processing at S5, the defect detection unit 32 outputs the detected result acquired in the processing at S5, to the output unit 5. Note that, as necessary, the defect detection unit 32 may output the detected result acquired in the processing at S5, from the IF unit 6.

Next, the defect detection unit 32 determines whether to finish the present processing (S7). From a result of the determination, for example, in a case where a reception has been made for finish of the present processing from the user through the input unit 4, the defect detection unit 32 determines to finish the present processing (Yes), and the defect detection unit 32 finishes the present processing. Meanwhile, in a case where the present processing is not to be finished (No), the defect detection unit 32 returns the processing to the processing at S4 for performance of the next inspection. For example, in a case where the next inspection object Ob or the next inspection face of the inspection object Ob is inspected without changing the grade value indicating the degree of visibility for orange peel, after the inspection object Ob is changed to the next inspection object Ob or the inspection face is changed to the next inspection face, the processing is returned to the processing at S4. Meanwhile, in a case where the inspection itself finishes or in a case where the next inspection object Ob or the next inspection face is inspected with changing the grade value indicating the degree of visibility for orange peel, the present processing finishes.

As described above, according to the surface defect inspection device D according to the present embodiment and the surface defect inspection method implemented therein, the range of the defect detection image region (range of the light image in the above (width of the light image)) is adjusted in accordance with the previously defined degree of visibility for orange peel, at detection of the defect at the inspection face. Therefore, according to the surface defect inspection device and the surface defect inspection method, the range of the defect detection image region (range of the light image in the above (width of the light image)) can be maximized in accordance with the degree of visibility for orange peel, so that inspection time can be shortened with reduction of wrong detection of orange peel.

According to the surface defect inspection device and the surface defect inspection method, because the correspondence relationship information storage unit 71 stores the correspondence relationship information (correspondence relationship information table TBa in a table format in the above), the adjustment value can be easily determined from the degree of visibility for orange peel with reference to the correspondence relationship information. Thus, the range of the defect detection image region (range of the light image in the above (width of the light image)) can be adjusted with the determined adjustment value.

Note that, according to the embodiment, the illuminator 1a includes a high-luminance display, such as a high-luminance liquid crystal display. However, the illuminator 1a is not limited to this, and thus can be appropriately changed.

Figure 10A:
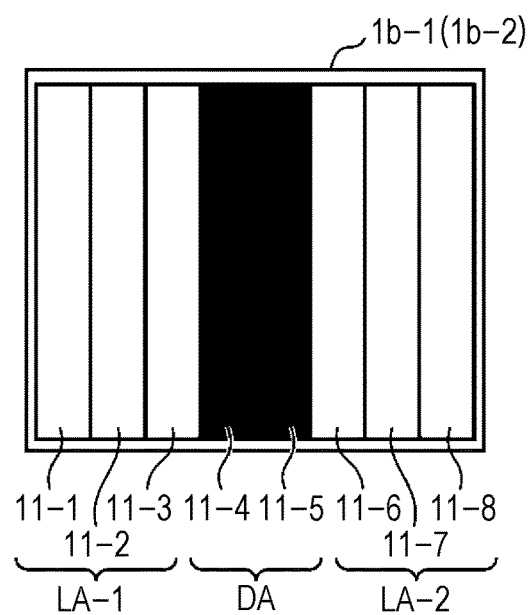
FIG. 10 is an explanatory view of an illuminator according to a second aspect in the surface defect inspection device and exemplary illumination patterns thereof.
Figure 10B:
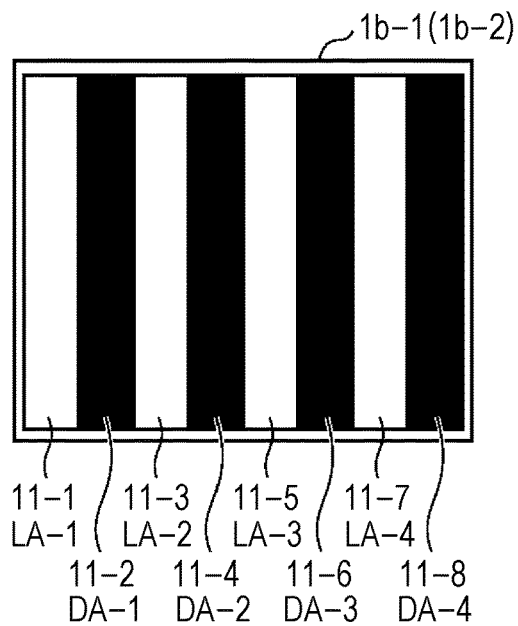

FIG. 10 is an explanatory view of an illuminator according to a second aspect in the surface defect inspection device and exemplary illumination patterns thereof. FIG. 10A illustrates an illuminator 1b-1 (1b-2) radiating illumination light in a first illumination pattern. FIG. 10B illustrates the illuminator 1b-1 (1b-2) radiating illumination light in a second illumination pattern. For example, instead of the illuminator 1a, an illuminator 1b including the first and second illuminators 1b-1 and 1b-2 illustrated in FIG. 10, may be used. The first and second illuminators 1b-1 and 1b-2 each include a plurality of linear illumination units 11 sequentially disposed in parallel, as illustrated in FIG. 10. In the example illustrated in FIG. 10, the plurality of linear illumination units 11 includes eight illumination units of first to eighth linear illumination units 11-1 to 11-8. The first to eighth linear illumination units 11-1 to 11-8 each include a linear light source unit in a linear shape with a light emitting face in an elongate rectangular shape (zonal shape, stripe shape), such as a linear fluorescent lamp or a plurality of high-luminance LEDs disposed linearly, and a rectangular diffuser disposed ahead of the linear light source unit, in which the linear light source unit radiates illumination light through the diffuser. In a case where the illuminator 1b is used, the control unit 31 turns on the plurality of linear illumination units 11 such that the range of the light region received by the input unit 4 is achieved. In a specific example, in the processing at S1 and the processing at S3, the control unit 31 controls each of the first and second illuminators 1b-1 and 1b-2 in the illuminator 1b such that, as illustrated in FIG. 10A, an illumination pattern is achieved in which a first light region LA-1 in a relatively wide rectangular shape, a dark region DA in a rectangular shape narrower in width than the first light region LA-1, and a second light region LA-2 in a rectangular shape the same in width as the first light region LA-1, are sequentially disposed in parallel. That is, in the processing at S3, the control unit 31 turns on the first to third linear illumination units 11-1 to 11-3 and the sixth to eighth linear illumination units 11-6 to 11-8, and turns off the fourth and fifth linear illumination units 11-4 and 11-5. In another specific example, in the processing at S1 and the processing at S3, the control unit 31 controls each of the first and second illuminators 1b-1 and 1b-2 in the illuminator 1b such that, as illustrated in FIG. 10B, a light-and-dark illumination pattern is achieved in which four light regions of first to fourth light regions LA-1 to LA-4 each in a relatively narrow rectangular shape and four dark regions of first to fourth dark regions DA-1 to DA-4 in a rectangular shape the same in width as the first to fourth light regions LA-1 to LA-4, are alternately disposed in parallel. That is, in the processing at S3, the control unit 31 turns on the first, third, fifth, and seventh linear illumination units 11-1, 11-3, 11-5, and 11-7, and turns off the second, fourth, sixth, and eighth linear illumination units 11-2, 11-4, 11-6, and 11-8.

According to the embodiment, the correspondence relationship information storage unit 71 stores, as the correspondence relationship information, the adjustment value in association with the degree of visibility for orange peel. However, the correspondence relationship information storage unit 71 may store, as the correspondence relationship information, the adjustment value further in association with the type of the inspection object Ob. In this case, the input unit 4 further receives input of the type of the inspection object Ob. The region adjustment unit 321 determines the adjustment value corresponding to the degree of visibility for orange peel and the type of the inspection object Ob received by the input unit 4, from the correspondence relationship information stored in the correspondence relationship information storage unit 71, and makes an adjustment at the determined adjustment value. The degree of allowable orange peel varies depending on the type of the inspection object Ob. For example, non-allowable orange peel to the hood of a vehicle is possible to be allowed to a door. According to the surface defect inspection device and the surface defect inspection method, because the adjustment value is associated with not only the degree of visibility for orange peel but also the type of the inspection object Ob, the adjustment value can be determined in consideration of not only the degree of visibility for orange peel but also the type of the inspection object Ob.

Figure 11:
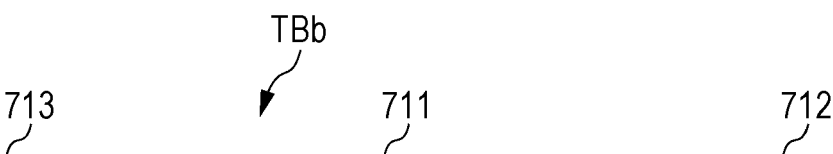
FIG. 11 illustrates a correspondence relationship information table according to the second aspect, stored in the surface defect inspection device.

FIG. 11 illustrates a correspondence relationship information table according to the second aspect, stored in the surface defect inspection device. For example, in a case where the inspection object Ob is an exteriorly painted vehicle, the type of the inspection object Ob is classified with parts of the vehicle. The correspondence relationship information storage unit 71 stores, as the correspondence relationship information, the adjustment value in association with the degree of visibility for orange peel and the parts of the vehicle. For example, as illustrated in FIG. 11, the correspondence relationship information is stored in a table format in the correspondence relationship information storage unit 71. The correspondence relationship information table TBb illustrated in FIG. 11 further includes a parts field 713 in which the parts of the vehicle are registered, such as a door, a roof, and a hood, in addition to the orange-peel visibility-degree field 711 in which the grades indicating the degree of visibility for orange peel are registered, and the adjustment-value field 712 in which the adjustment value is registered. The adjustment-value field 712 has the adjustment value registered corresponding to each grade registered in the orange-peel visibility-degree field 711 and each part registered in the parts field 713. The correspondence relationship information table TBb has a record for each combination between the grades and the parts. Note that the correspondence relationship information table TBb may have a record every combination to all combinations of the grades and the parts, but may have a record every combination to partial combinations of all the combinations.

According to the surface defect inspection device D and the surface defect inspection method, the adjustment value can be determined in consideration of not only the degree of visibility for orange peel but also the parts of the vehicle.

The present specification discloses the techniques according to the various aspects as above, and main techniques therefrom will be summarized below.

According to one aspect, provided is a surface defect inspection device that irradiates an inspection face of an inspection object with illumination light, and detects a defect at the inspection face, based on an image including the inspection face captured, the surface defect inspection device including: an illuminator that forms at least one set of a light region and a dark region, and emits the illumination light with the formation; and a region adjustment unit that adjusts a range of a defect detection image region for the detection of the defect, to be set to the image capturing the inspection face irradiated with the illumination light in the light region, in accordance with a previously defined degree of visibility for orange peel, at the detection of the defect at the inspection face.

According to the surface defect inspection device, the range of the defect detection image region is adjusted in accordance with the previously defined degree of visibility for orange peel, at the detection of the defect at the inspection face. Therefore, according to the surface defect inspection device, the range of the defect detection image region can be maximized in accordance with the degree of visibility for orange peel, so that inspection time can be shortened with reduction of wrong detection of orange peel.

According to another aspect, the surface defect inspection device further includes: a correspondence relationship information storage unit storing, as correspondence relationship information, an adjustment value for the adjustment of the range of the defect detection image region, in association with the degree of visibility for orange peel; and an input unit that receives input of the degree of visibility for orange peel, in which the region adjustment unit determines the adjustment value corresponding to the degree of visibility for orange peel received by the input unit, from the correspondence relationship information stored in the correspondence relationship information storage unit, and adjusts the range of the defect detection image region with the determined adjustment value.

According to the surface defect inspection device, because of the storage of the correspondence relationship information, the adjustment value can be easily determined from the degree of visibility for orange peel, with reference to the correspondence relationship information, so that the range of the defect detection image region can be adjusted with the determined adjustment value.

According to another aspect, in the surface defect inspection device, the correspondence relationship information storage unit stores, as the correspondence relationship information, the adjustment value further in association with a type of the inspection object, the input unit further receives input of the type of the inspection object, and the region adjustment unit determines the adjustment value corresponding to the degree of visibility for orange peel and the type of the inspection object received by the input unit, from the correspondence relationship information stored in the correspondence relationship information storage unit, and adjusts the range of the defect detection image region with the determined adjustment value.

The degree of allowable orange peel varies depending on the type of the inspection object. For example, non-allowable orange peel to the hood of a vehicle is possible to be allowed to a door. According to the surface defect inspection device, because the adjustment value is associated with not only the degree of visibility for orange peel but also the type of the inspection object, the adjustment value can be determined in consideration of not only the degree of visibility for orange peel but also the type of the inspection object.

According to another aspect, in the surface defect inspection device, the inspection object is an exteriorly painted vehicle, and the type of the inspection object is classified with a part of the vehicle.

According to the surface defect inspection device, the adjustment value can be determined in consideration of not only the degree of visibility for orange peel but also the part of the vehicle.

According to another aspect, the surface defect inspection device further includes: a second input unit that receives input of a range of the light region; and a control unit that controls the illuminator such that the range of the light region received by the second input unit is achieved. Preferably, in the surface defect inspection device, the illuminator includes: a light source unit that radiates light; and a light-and-dark region formation unit that forms at least one set of the light region and the dark region, and makes illumination with the light radiated from the light source unit as the illumination light, in which the control unit controls the light-and-dark region formation unit such that the range of the light region received by the second input unit is achieved. Preferably, in the surface defect inspection device, the illuminator is a high-luminance display, such as a high-luminance liquid crystal display, and the control unit controls the high-luminance display such that the range of the light region received by the second input unit is achieved. Preferably, in the surface defect inspection device, the illuminator includes a plurality of linear illumination units sequentially disposed in parallel, and the control unit turns on the plurality of linear illumination units such that the range of the light region received by the second input unit is achieved. Preferably, in the surface defect inspection device, the illuminator forms a plurality of sets of the light region and the dark region and emits the illumination light.

According to another aspect, provided is a surface defect inspection method including irradiating an inspection face of an inspection object with illumination light, and detecting a defect at the inspection face, based on an image including the inspection face captured, the surface defect inspection method including: emitting the illumination light with formation of at least one set of a light region and a dark region; and adjusting a range of a defect detection image region for the detection of the defect, to be set to the image capturing the inspection face irradiated with the illumination light in the light region, in accordance with a previously defined degree of visibility for orange peel, at the detection of the defect at the inspection face.

According to the surface defect inspection method, the range of the defect detection image region is adjusted in accordance with the previously defined degree of visibility for orange peel, at the detection of the defect at the inspection face. Therefore, according to the surface defect inspection method, the range of the defect detection image region can be maximized in accordance with the degree of visibility for orange peel, so that inspection time can be shortened with reduction of wrong detection of orange peel.

This application is based on Japanese Patent Application No. 2017-105516, filed on May 29, 2017, the entire contents of which are incorporated herein by reference.

The embodiment of the present invention has been given with the detailed illustrations and descriptions. However, the present invention is not limited to the embodiment because the illustrations and descriptions are just exemplary. The scope of the present invention should be interpreted by the statement of the accompanying claims.

In order to express the present invention, the present invention has been appropriately and sufficiently described above through the embodiment with reference to the drawings. It should be recognized that those skilled in the art may at least alter or improve the embodiment, easily. Therefore, as long as alterations or improvements made by those skilled in the art do not depart from the scope of the claims described in the claims, the alterations or the improvements are interpreted to be included in the scope of the claims.

INDUSTRIAL APPLICABILITY

According to the present invention, provided can be the surface defect inspection device that detects a surface defect and the surface defect inspection method of detecting a surface defect.

The invention claimed is:

1. A surface defect inspection device that irradiates an inspection face of an inspection object with illumination light, and detects a defect at the inspection face, based on an image including the inspection face captured, the surface defect inspection device comprising:
   an image capturing unit configured to capture an image;
   an illuminator that forms at least one set of a light region and a dark region, and emits the illumination light with the formation;
   a region adjuster that adjusts a range of a defect detection image region for the detection of the defect, to be set to the image capturing the inspection face irradiated with the illumination light in the light region, in accordance with a previously defined degree of visibility for orange peel, at the detection of the defect at the inspection face;
   a correspondence relationship information storage storing, as correspondence relationship information, an adjustment value for the adjustment of the range of the defect detection image region, in association with the degree of visibility for orange peel; and
   an inputter that receives input of the degree of visibility for orange peel,
   wherein the region adjuster determines the adjustment value corresponding to the degree of visibility for orange peel received by the inputter, from the correspondence relationship information stored in the correspondence relationship information storage, and adjusts the range of the defect detection image region with the determined adjustment value.

2. The surface defect inspection device according to claim 1,
   wherein the correspondence relationship information storage unit stores, as the correspondence relationship information, the adjustment value further in association with a type of the inspection object,
   the inputter further receives input of the type of the inspection object, and the region adjuster determines the adjustment value corresponding to the degree of visibility for orange peel and the type of the inspection object received by the inputter, from the correspondence relationship information stored in the correspondence relationship information storage, and adjusts the range of the defect detection image region with the determined adjustment value.

3. The surface defect inspection device according to claim 2, wherein the inspection object is an exteriorly painted vehicle, and the type of the inspection object is classified with a part of the vehicle.

4. The surface defect inspection device according to claim 3, further comprising: a second inputter that receives input of a range of the light region; and a controller that controls the illuminator such that the range of the light region received by the second inputter is achieved.

5. The surface defect inspection device according to claim 2, further comprising: a second inputter that receives input of a range of the light region; and a controller that controls the illuminator such that the range of the light region received by the second inputter is achieved.

6. The surface defect inspection device according to claim 1, further comprising:
a second inputter that receives input of a range of the light region; and
a controller that controls the illuminator such that the range of the light region received by the second inputter is achieved.

7. The surface defect inspection device according to claim 1, further comprising:
a second inputter that receives input of a range of the light region; and a controller that controls the illuminator such that the range of the light region received by the second inputter is achieved.

8. The surface defect inspection device according to claim 1, wherein the correspondence relationship information storage unit stores a plurality of adjustment values in association with the degree of visibility for orange peel, and the inputter selects one in association with the degree of visibility for orange peel among a plurality of options.

9. A surface defect inspection method including irradiating an inspection face of an inspection object with illumination light, and detecting a defect at the inspection face, based on an image including the inspection face captured, the surface defect inspection method comprising:
capturing an image;
emitting the illumination light with formation of at least one set of a light region and a dark region;
adjusting a range of a defect detection image region for the detection of the defect, to be set to the image capturing the inspection face irradiated with the illumination light in the light region, in accordance with a previously defined degree of visibility for orange peel, at the detection of the defect at the inspection face;
storing correspondence relationship information, as correspondence relationship information in a correspondence relationship information storage, an adjustment value for the adjustment of the range of the defect detection image region, in association with the degree of visibility for orange peel; and
receiving, by an inputter, input of the degree of visibility for orange peel,
wherein the region adjuster determines the adjustment value corresponding to the degree of visibility for orange peel received by the inputter, from the correspondence relationship information stored in the correspondence relationship information storage, and adjusts the range of the defect detection image region with the determined adjustment value.

10. The surface defect inspection method according to claim 9, wherein the correspondence relationship information storage stores a plurality of adjustment values in association with the degree of visibility for orange peel, and the inputter selects one in association with the degree of visibility for orange peel among a plurality of options.

* * * * *